(12) United States Patent
Miyazaki

(10) Patent No.: US 7,421,210 B2
(45) Date of Patent: Sep. 2, 2008

(54) OPTICAL TRANSMISSION METHOD AND SYSTEM

(75) Inventor: Tetsuya Miyazaki, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 612 days.

(21) Appl. No.: 11/000,838

(22) Filed: Nov. 30, 2004

(65) Prior Publication Data

US 2005/0117915 A1 Jun. 2, 2005

(30) Foreign Application Priority Data

Dec. 1, 2003 (JP) ............................. 2003-401473

(51) Int. Cl.
*H04B 10/04* (2006.01)
*H04B 10/00* (2006.01)

(52) U.S. Cl. .................. 398/188; 398/184; 398/198; 398/152

(58) Field of Classification Search ............... 398/188, 398/183, 185, 198, 184, 152, 27; 359/279
See application file for complete search history.

(56) References Cited

U.S. PATENT DOCUMENTS

| | | | |
|---|---|---|---|
| 5,319,438 A | | 6/1994 | Kiasaleh |
| 6,122,086 A | * | 9/2000 | Djupsjobacka ............... 398/185 |
| 6,271,950 B1 | * | 8/2001 | Hansen et al. ............... 398/154 |
| 6,404,535 B1 | * | 6/2002 | Leight ........................ 359/306 |
| 6,421,155 B1 | * | 7/2002 | Yano ........................... 398/183 |
| 2004/0081470 A1 | * | 4/2004 | Griffin ........................ 398/188 |
| 2004/0208646 A1 | | 10/2004 | Choudhary et al. |
| 2005/0069330 A1 | * | 3/2005 | Kao et al. ................... 398/188 |

FOREIGN PATENT DOCUMENTS

| | | |
|---|---|---|
| EP | 0 168 192 | 1/1986 |
| JP | 44-25524 | 10/1969 |
| JP | 61-35032 | 2/1986 |

(Continued)

OTHER PUBLICATIONS

Kazovsky, "Balanced Phase-Locked Loops for Optical Homodyne Receivers: Performance Analysis, Design Considerations, and Laser Linewidth Requirements," Journal of Lightwave Technology, vol. LT-4, No. 2, Feb. 1986, pp. 182-195.

(Continued)

*Primary Examiner*—M. R. Sedighian
(74) *Attorney, Agent, or Firm*—Christie, Parker & Hale, LLP

(57) ABSTRACT

An optical transmitter splits a linear polarization optical carrier into a TE wave and a TM wave. One of the TE wave and the TM wave is phase-modulated with a transmission data so as to generate a phase-modulated signal. The phase-modulated signal and the other one of the TE wave and the TM wave are coupled with a linear polarization and output into an optical transmission line. An optical receiver splits a light input from the optical transmission line into the TE wave and the TM wave. The TM wave or TE wave is converted into the TE wave or TM wave to interfere with the TE wave or TM wave. The interfered signal light is converted into an electric signal for restoration of the data.

11 Claims, 5 Drawing Sheets

FOREIGN PATENT DOCUMENTS

| | | |
|---|---|---|
| JP | 5-167535 | 7/1993 |
| JP | 2003-249897 | 9/2003 |

OTHER PUBLICATIONS

Camatel, et al., "10 Gbit/S 2-PSK Transmission and Homodyne Coherent Detection Using Commercial Optical Components," ECOC 2003, vol. 3, We. P. 122, pp. 800-801.

Marra, et al., "Optical SSB Modulation using Fiber Bragg Gratings and the Impact of Grating Dispersion on Transmission Performance," 2001 IEEE, Tu-3.5, pp. 93-96.

Smith, et al., "Novel Technique For Generation of Optical SSB With Carrier Using A Single MZM To Overcome Fiber Chromatic Dispersion," MWP 1996, pp. 5-8.

Izutsu, Masayuki et al., "Integrated Optical SSB Modulator/Frequency Shifter", IEEE Journal of Quantum Electronics, vol. QE-17, No. 11, Nov. 1981; pp. 2225-2227.

\* cited by examiner

OPTICAL TRANSMISSION METHOD AND SYSTEM

CROSS REFERENCE TO RELATED APPLICATIONS

This application claims priority to Japanese Patent Application No. 2003-401473, filed Dec. 1, 2003, the entire contents of which are incorporated herein by reference.

FIELD OF THE INVENTION

This invention generally relates to an optical transmission method and system to use an optical phase modulation.

BACKGROUND OF THE INVENTION

In optical phase modulation, the efficiency of frequency utilization per bit rate is high. PSK (Phase Shift Keying) and DPSK (Differential Phase Shift Keying) are well known as such optical phase modulation in the art.

In complete modulation, it is necessary to dispose an optical phase locked loop (PLL) circuit for regenerating an optical carrier on a receiving side and moreover an optical Costas loop is required for the optical PLL. An optical PLL in an optical receiver in homodyne detection is described in "Balanced phase-locked loops for optical Homodyne receivers: Performance Analysis, Design Considerations, and laser Linewidth Requirements" by Leonid G. Kazovsky, Journal of lightwave technology, Vol. LT-4, No. 2, February 1986 and "10 GBIT/S 2-PSK TRANSMISSION AND HOMODYNE COHERENT DETECTION USING COMMERCIAL OPTICAL COMPONENTS" by Stefano Camatel et al., ECOC 2003, Vol. 3, We. P. 122, pp. 800-801. Because of the abovementioned reasons, incomplete modulation is generally used in which optical carriers resides. The contents of the above papers are incorporated in this specification for reference.

In the incomplete modulation, as an amount of residual carriers increases , a level of PSK signals becomes lower, and accordingly, a signal to noise ratio (SNR) also deteriorates. Under such circumstances, an optical receiver is forced to operate an optical PLL depending on a small amount of optical carriers and therefore demodulating operation becomes unstable.

SUMMARY OF THE INVENTION

An optical transmission method according to one exemplary embodiment of the invention comprises outputting an output light having first and second polarization components, the first and second polarization components being orthogonal to each other; generating a phase-modulated signal light by phase-modulating the first polarization component of the output light according to a transmission data to output the generated phase-modulated signal light and the second polarization component into an optical transmission line in an orthogonal polarization state; coupling the phase-modulated signal light and the second polarization component input from the optical transmission line in the same polarization direction so as to convert the phase-modulated signal light into an intensity-modulated signal light; converting the intensity-modulated signal light into an electric signal; and restoring the transmission data from the electric signal.

According to one exemplary embodiment of the invention, an optical transmission system to transmit a transmission signal via an optical transmission line by phase modulation is provided. The optical transmission system includes an optical transmitter for transmitting the transmission signal via the optical transmission line and an optical receiver for receiving the transmission signal via the optical transmission line. The optical transmitter comprises a laser light source to generate a laser light having first and second polarization components, the first and second polarization components being orthogonal to each other; and a data modulator to phase-modulate the first polarization component in the laser light of the laser light source according to a transmission data and to output the generated phase-modulated signal light and the second polarization component in an orthogonal polarization state. The optical receiver comprises a polarization splitter to split the transmission signal output from the optical transmission line into a third polarization component that includes the phase-modulated signal light and a fourth polarization component being orthogonal to the third polarization component; a polarization coupler to couple the third and fourth polarization components in the same polarization direction; a photoelectric converter to convert an output signal light from the polarization coupler into an electric signal; and a restorer to restore the transmission data out of the electric signal output from the photoelectric converter.

According to the invention, a phase-modulated signal generated through complete modulation is carried by one of the two orthogonal polarizations and an optical carrier or at least a portion of the optical carrier is carried by the other, and therefore the optical receiver can receive a signal without using an optical PLL. This makes the configuration of an optical receiver much simpler.

BRIEF DESCRIPTION OF THE DRAWINGS

The above and other objects, features and advantages of the present invention will be apparent from the following detailed description of explanatory embodiments of the invention in conjunction with the accompanying drawings, in which.

DETAILED DESCRIPTION

Explanatory embodiments of the invention are explained below in detail with reference to the drawings.

Figure 1:
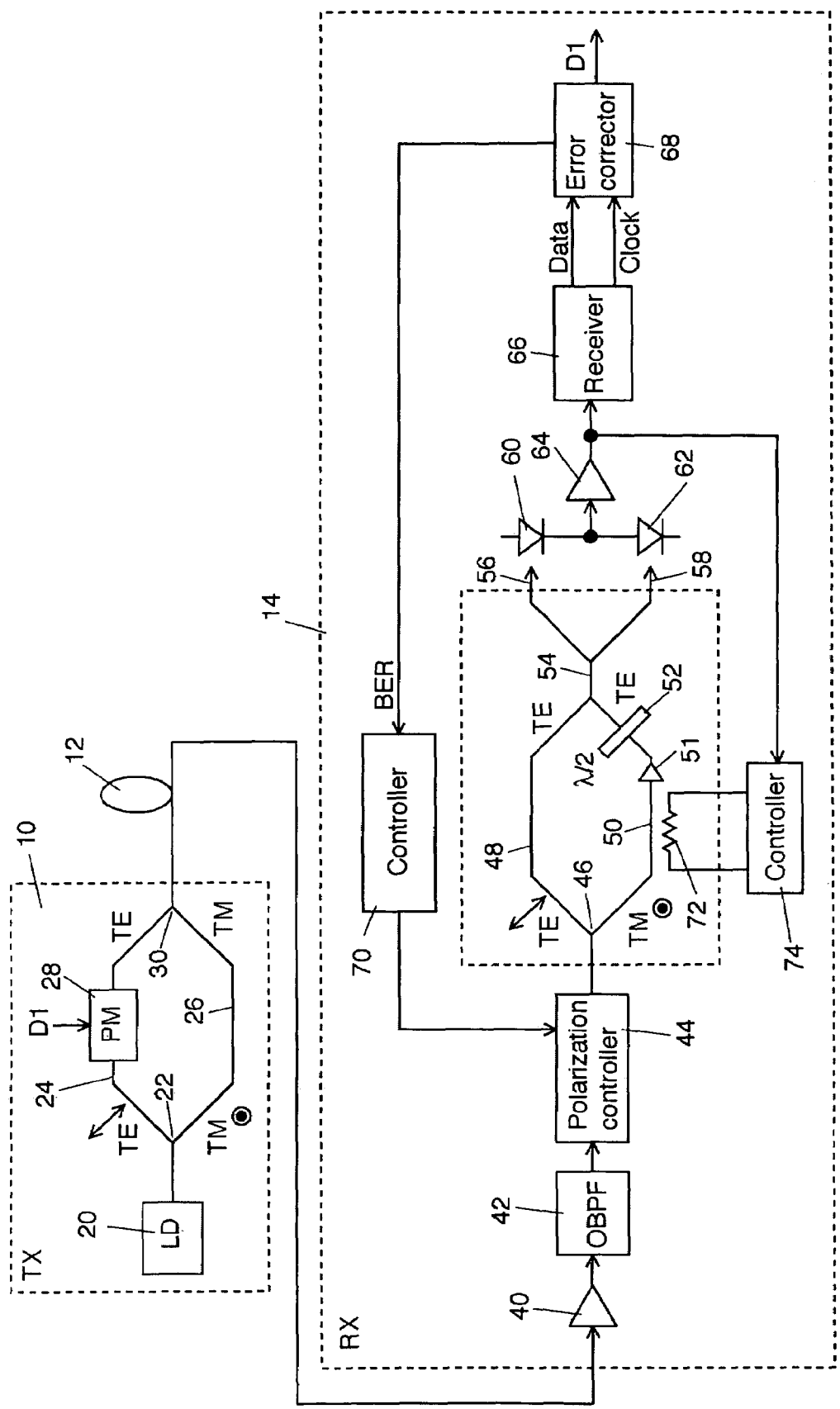
FIG. 1 is a schematic block diagram of a first explanatory embodiment according to the invention.

FIG. 1 shows a schematic block diagram of a first explanatory embodiment according to the invention. An optical transmitter 10 outputs a PSK signal light into an optical transmission line 12. The PSK signal light having transmitted in the optical transmission line 12 enters an optical receiver 14.

The configuration and operation of the optical transmitter 10 is explained below in detail. A laser light source 20 outputs a continuous wave laser light (or pulse laser light) of a signal wavelength λs. A polarization beam splitter 22 splits an output light from the laser light source 20 into two orthogonal polarization components, i.e. a TE-wave and a TM-wave, and applies one component, e.g. the TE-wave, to an arm 24 and the other, e.g. the TM-wave, to an arm 26. A phase modulator 28 disposed on the arm 24 is to binary-modulate the optical phase of the TE-wave from the polarization beam splitter 22 into 0 or π according to a to-be-transmitted data D1. A polarization coupler 30 couples the TM-wave from the arm 26 and the phase-modulated TE-wave from the arm 24 and outputs the coupled light into the optical transmission line 12. In this embodiment, the TE-wave transmits the data D1 and the TM-wave transmits the optical carrier.

When an output laser light having linear polarization from the laser light source 20 is applied to a LiNbO$_3$ optical phase modulator, to which an electric field for data-modulation is applied, at an angle of 45°, the LiNbO$_3$ optical phase modulator can realize functions equal to those of the polarization beam splitter 22, the phase modulator 28, and the polarization coupler 30. This is because the LiNbO$_3$ optical phase modulator modulates a phase of a polarization component having the same direction to the applied electric field and does not modulate a phase of a polarization component orthogonal to the applied electric field.

The configuration and operation of the optical receiver 14 is explained below in detail. The signal light input from the optical transmission line 12 is amplified by an optical amplifier 40 and enters an optical bandpass filter 42 of a central transmission wavelength λs. The optical bandpass filter 42 extracts a component of the signal wavelength λs from a light output from the optical amplifier 40 to remove noise components except for the signal wavelength λs generated in the optical amplifier 40 and the other parts. An output light from the optical bandpass filter 42 enters a polarization beam splitter 46 via a polarization controller 44. According to a control signal from an after-mentioned controller 70, the polarization controller 44 controls a direction of the polarization of the output light from the optical bandpass filter 42 so that the polarization beam splitter 46 applies one polarization component, i.e. a TE-wave, included in an output from the polarization bandpass filter 42 to the arm 48 and the other to the arm 50. A polarization controller having such functions like the polarization controller 44 is well known in the art.

An optical amplifier 51 and a polarization converter, specifically a half-wave plate 52, to convert a TM-wave to a TE-wave are disposed on the arm 50. The TM-wave on the arm 50 is converted to a TE-wave by the half-wave plate 52. The optical amplifier 51 compensates the attenuation caused by the half-wave plate 52. It is applicable to dispose an attenuator on the arm 48 to approximately equalize the power of an output from the arm 48 and the power of an output from the arm 50.

The output from the arm 48 is a TE-wave while the output from the arm 50 is also a TE-wave since its polarization was converted by the polarization converter 52, and accordingly those two outputs are capable of interfering each other. As a result of the interference, the phase-modulated signal from the phase modulator 28 is converted into an OOK (On-Off-keying) signal that transmits a signal through ON/OFF of the optical intensity. For this operation, a coupler/splitter 54 couples the TE-wave from the arm 48 and the TE-wave from the arm 50 and thereafter splits them. The coupler/splitter 54 has two outputs referred to as a constructive output and a destructive output.

One output light 56 from the coupler/splitter 54 enters a first photodiode 60 and the other output light 58 enters a second photodiode 62. Each of the photodiodes 60 and 62 converts an input light into an electric signal. The photodiodes 60 and 62 are connected in serial and their contact connects to an electric receiver 66 via an amplifier 64. The photodiodes 60 and 62 configure a balanced receiver and owing to the configuration the receiving sensitivity is improved by approximately 3 dB.

In a case that such balanced reception is not used, an optical coupler that merely outputs an OOK signal light should be disposed instead of the coupler/splitter 54.

The electric receiver 66 restores a data and a clock from the electric signal output from the amplifier 64 and applies them to an error corrector 68. The error corrector 68 corrects transmission errors in the optical transmission line 12 referring to an error correction signal which was added to the data D1 at the optical transmitter 10. The error corrector 68 further calculates a bit error rate (BER) of a signal light and applies it to a controller 70. The controller 70 controls a direction of polarization of an output light from the polarization controller 44 so as to reduce the BER. As explained above, the polarization controller 44 controls a direction of polarization of an output light from the bandpass filter 42 with the control loop so that the polarization beam splitter 46 can split a received signal light into the TE component and the TM component.

The orthogonality of the TE component and the TM component in an output light from the optical transmitter 10 sometimes fluctuates because of the polarization dependency of the optical transmission line 12. To compensate the fluctuation, in this embodiment, the optical path length of the arm 50 is controlled. That is, a heater 72 is disposed adjacent to the arm 50 and a controller 74 controls the heater 72 so as to decrease low-pass components in an output from the amplifier 64. The controller 74 comprises an active filter or low-pass filter to extract a low-pass component out of an output from the amplifier 64. The passband width of the active filter is approximately several hundreds Hz in optical transmission at 10 Gbps, for example, and in other word it can be equivalent to the line width of the laser light source 20. It is understood that the heater 72 can be disposed on the arm 48 as well.

In the reception of a signal having transmitted with the TE wave, functionally, the half-wave plate 52 that functions as a polarization converter on the arm 50 has a role identical to a local oscillator. Owing to that function, a phase-modulated signal can be demodulated without an optical PLL in this embodiment. Further more, this embodiment can be understood such that a local oscillator which originally should be disposed on an optical receiver is disposed on an optical transmitter, and its local-oscillated signal is transmitted from the optical transmitter 10 to the optical receiver 14 through the same transmission path with a signal light.

Figure 2:
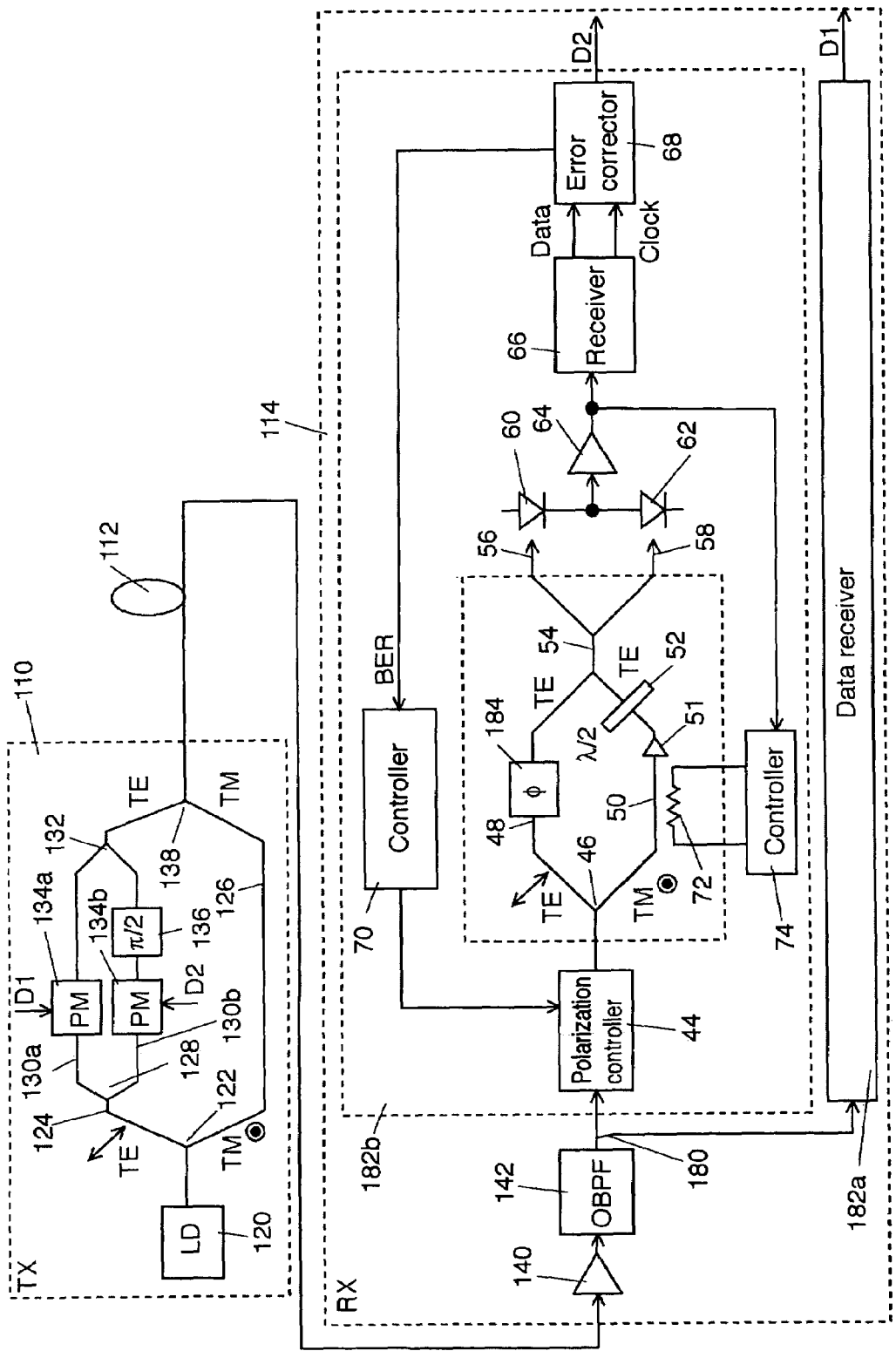
FIG. 2 is a schematic block diagram of a second explanatory embodiment according to the invention.

This invention can be applied to multilevel PSK. FIG. 2 shows a schematic block diagram of an explanatory embodiment according to the invention to realize QPSK (Quadrature Phase Shift Keying) transmission.

A transmitter 110 outputs a QPSK signal light into an optical transmission line 112. The QPSK signal light having propagated in the optical transmission line 112 enters an optical receiver 114.

The configuration and operation of the optical transmitter 110 is explained below. A laser light source 120 outputs a continuous wave laser light (or pulse laser light) of a signal wavelength λs. A polarization beam splitter 122 splits an output light from the laser light source 120 into two polarization components, i.e. a TE wave and a TM wave, and applies one of the components, e.g. the TE wave, to an arm 124 and the other, e.g. the TM wave, to an arm 126.

On the arm 124, a splitter 128 to split an input light into two portions, arms 130a and 130b to transmit the split outputs from the splitter 128 respectively, and a coupler 132 to couple the outputs from the arms 130a and 130b are disposed. On one arm 130a, a phase modulator 134a to phase-modulate an input light with 0 or π according to a data D1 is disposed. On the other arm 130b, a phase modulator 134b to phase-modulate an input light with 0 or π according to a data D2 and a phase shifter 136 to shift phase of an output light from the phase modulator 134b by π/2 are disposed. The output light from the coupler 132 is a QPSK signal light to carry the data D1 with (0, π) and the data D2 with (π/2, 3π/2), the QPSK signal being a combination of a PSK signal of (0, π) by the phase modulator 134a and a PSK signal light of (π/2, 3π/2) by the phase modulator 134b and the phase shifter 136.

A polarization coupler 138 couples a TE wave (QPSK signal light) from the arm 124 and a TM wave from the arm 126 and outputs the coupled light into the optical transmission line 112.

The configuration and operation of the optical receiver 114 is explained below. A signal light input from the optical transmission line 112 is amplified by an optical amplifier 140 and enters an optical bandpass filter 142 of a transmission central wavelength λs. The optical bandpass filter 142 extracts a component of the signal wavelength λs out of an output light from the optical amplifier 140 to remove noise components except for the signal wavelength λs generated in the optical amplifier 140 and the other parts.

A splitter 180 splits an output light from the optical bandpass filter 142 into two portions and applies one portion to a data receiver 182a which receives a data D1 and the other to a data receiver 182b which receives a data D2. The configuration of the data receiver 182a, 182b is basically identical to the parts after the polarization controller 44 in the receiver 14 shown in FIG. 1. In FIG. 2, identical elements are labeled with reference numerals common to those in FIG. 1.

In the explanatory embodiment shown in FIG. 2, a phase shifter 184 to select a receiving channel is disposed on the arm 48 in each of the data receivers 182a and 182b. It is also applicable to dispose the phase shifter 184 on the arm 50 instead of the arm 48. When an amount of phase shift in the phase shifter 184 is set to 0 or π, it is possible to receive the data D1. When the amount of phase shift is set to −π/2 or π/2, it is possible to receive the data D2. Setting the amount of phase shift in the phase shifter 184 to 0 or π means that the phase shifter 184 can be omitted. By switching the amount of phase shift in the phase shifter 184 on the arm 48 in each data receiver 182a,182b, it is possible to interchange the data D1, D2 to be received by the data receivers 182a and 182b.

In the explanatory embodiment shown in FIG. 2, although the phase modulators 134a and 134b are disposed in parallel, a similar multilevel PSK signal light can be generated in such a configuration that a plurality of phase modulator are disposed in serial on the arm 124. In this case, the configuration of an optical receiver can be basically the same to that of the optical receiver 114.

Figure 3:
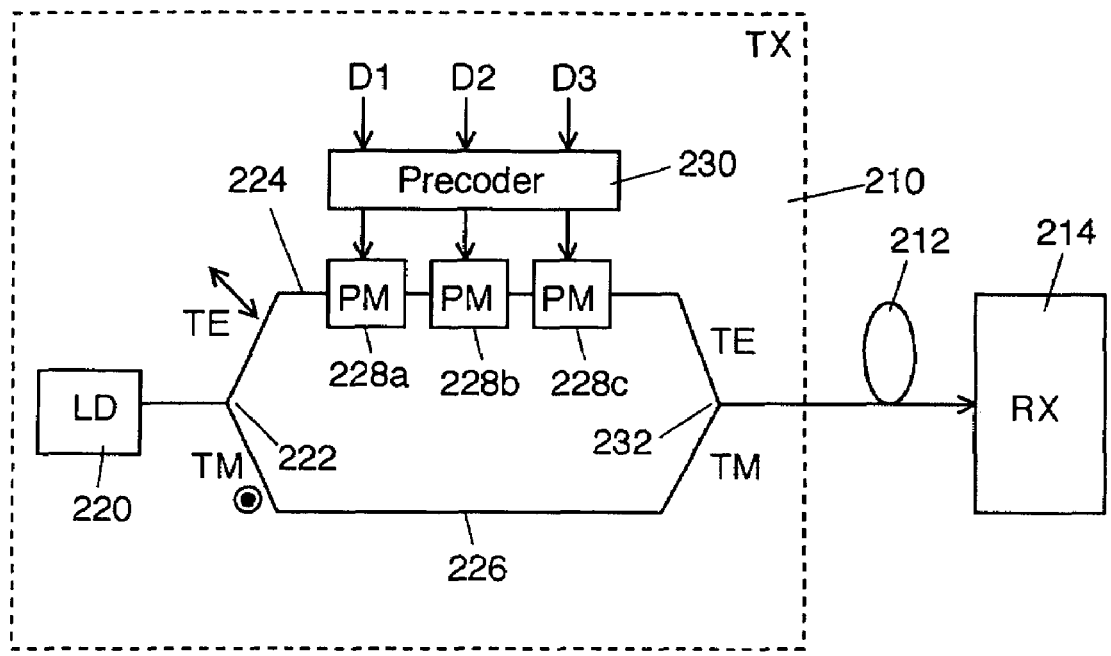
FIG. 3 is a schematic block diagram of an optical transmitter in a third explanatory embodiment according to the invention.
Figure 4:
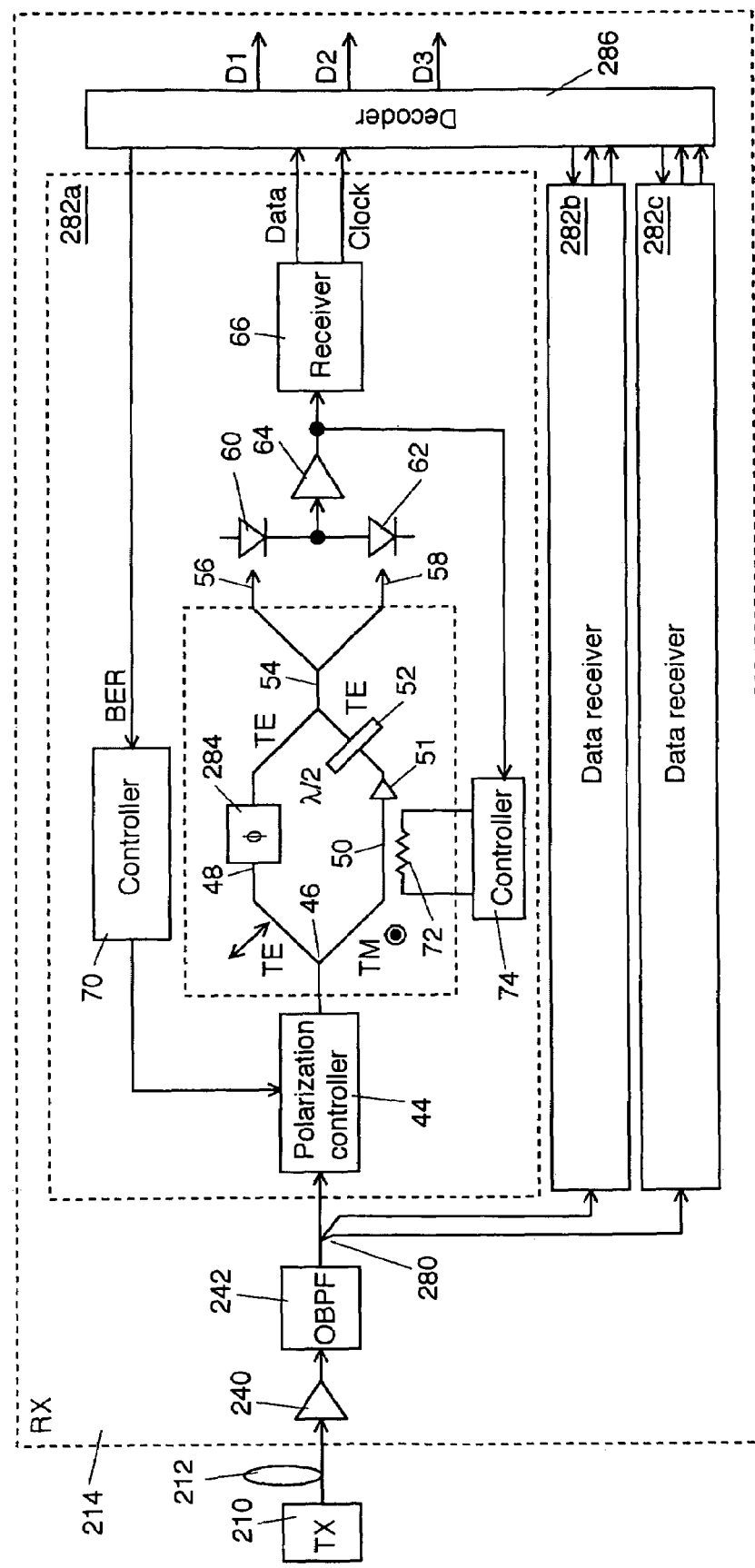
FIG. 4 is a schematic block diagram of an optical receiver in the third explanatory embodiment according to the invention.

FIG. 3 shows a schematic block diagram of an optical transmitter of an explanatory embodiment in multilevel PSK transmission wherein three phase modulators are disposed in serial, and FIG. 4 shows a schematic block diagram of an optical receiver of the embodiment. By disposing three phase modulators in serial, 8-level PSK transmission can be realized.

An optical transmitter 210 outputs an 8-level PSK signal light into an optical transmission line 212. The 8-level PSK signal having propagated in the optical transmission line 212 enters an optical receiver 214.

The configuration and operation of the optical transmitter 210 is explained below in detail with reference to FIG. 3. The laser light source 220 outputs a continuous wave laser light (or pulse laser light) of signal wavelength λs. A polarization beam splitter 222 splits an output light from the laser light source 220 into two orthogonal polarization components, namely a TE wave and a TM wave, and applies one portion, e.g. the TE wave, to an arm 224 and the other, e.g. the TM wave, to an arm 226. On the arm 224, three phase modulators of 228a, 228b, and 228c are disposed in serial.

A precoder 230 codes three data D1, D2, and D3 for phase modulation and drives the three phase modulators 228a, 228b, and 228c with obtained coded data. For instance, the precoder 230 drives the phase modulator 228a at a phase of (0, π/4), the phase modulator 228b at a phase of (0, π/2), and the phase modulator 228c at a phase of (0, π). With the above operation, an 8-level PSK signal light is generated.

The polarization coupler 232 couples the TM wave from the arm 226 and the PSK-modulated TE wave from the arm 224 and outputs the coupled light into the optical transmission line 212. In this embodiment, the data D1, D2, and D3 are transmitted with the TE wave and the optical carrier is transmitted with the TM wave.

The configuration and operation of the optical receiver 214 is explained below with reference to FIG. 4. A signal light input from the optical transmission line 212 is amplified by an optical amplifier 240 and enters an optical bandpass filter 242 having a central transmission wavelength λs. The optical bandpass filter 242 extracts a component of a signal wavelength λs out of an output light from the optical amplifier 240 and removes noise components except for the signal wavelength λs generated at the optical amplifier 240 and other parts. A splitter 280 splits an output light from the optical bandpass filter 242 into three portions and respectively applies them to data receivers 282a, 282b, and 282c. In FIG. 4, although an interior configuration of the data receiver 282a alone is illustrated in detail, interior configurations of the data receivers 282b and 282c are substantially identical to that of the data receiver 282a.

The main configurations of the data receiver 282a is basically identical to the parts after the polarization controller 44 of the optical receiver 14 in the explanatory embodiment shown in FIG. 1. In FIG. 4, elements identical to the interior components of the optical receiver 14 are labeled with common reference numerals to those in FIG. 1. In the explanatory embodiment shown in FIG. 4, a phase shifter 284 is disposed on the arm 48, the phase shifter 284 varying its phase shift amount according to that of a phase modulated signal by which one of the phase modulators of 228a, 228b, and 228c is demodulated. The phase shift amounts of the phase shifters 284 in the data receivers 282a,282b,and 282c are different with each other. A received data and its clock output from the receiver 66 are applied to a decoder 286. The decoder 286 decodes the data D1, D2, and D3 out of the received data from the data receivers 282a, 282b, and 282c. The decoder 286 applies a bit error rate (BER) of the received data in the data receiver 282a to a controller 70 in the data receiver 282a and similarly applies a BER of each of the received data in the data receivers 282b and 282c to a respective controller 70 in the data receivers 282b and 282c. The respective controller 70 in the data receivers 282a, 282b, and 282c controls the polarization controller 44 so that the BER from the decoder 286 becomes minimum. Accordingly, the polarization controller 44 controls polarization of each input light of the data receivers 282a, 282b, and 282c so that polarization having split at the polarization beam splitter 46 becomes optimum similar to the explanation of the first embodiment.

Although an optical carrier is transmitted with one polarization (the TM wave) in the above embodiments, it is also applicable to use a frequency shift together. By using the frequency shift, there is a merit to highly compress interference cross talk between an optical carrier and a data modulated signal component in optical fiber transmission.

Figure 5:
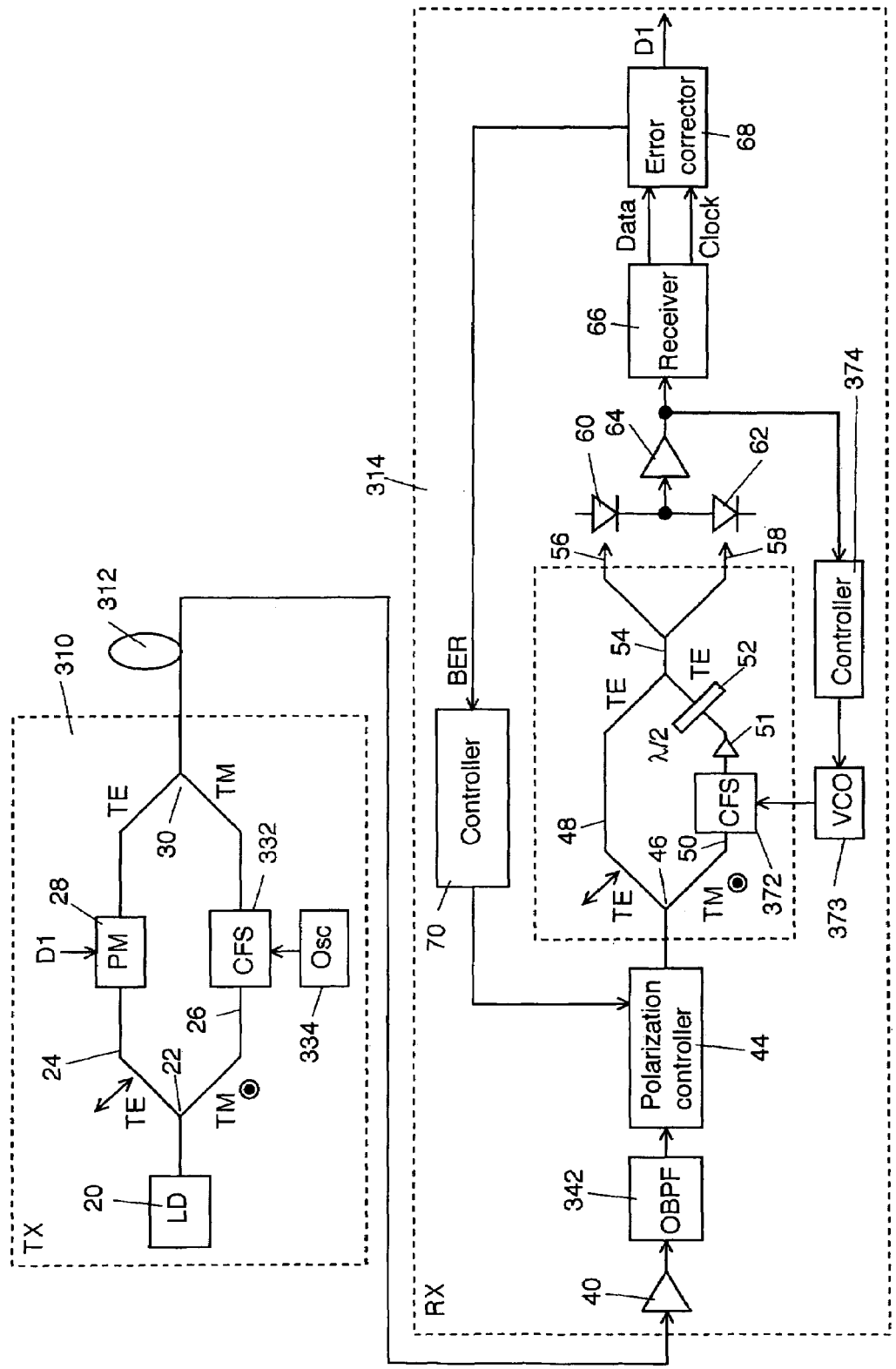
FIG. 5 is a schematic block diagram of a fourth explanatory embodiment according to the invention.

FIG. 5 shows a schematic block diagram of a modified embodiment in which a frequency shift is applied to the embodiment shown in FIG. 1. In FIG. 5, identical elements are labeled with reference numerals common to those in FIG. 1.

An optical transmitter 310 outputs a PSK signal light into an optical transmission line 312. The PSK signal light having transmitted the optical transmission line 312 enters an optical receiver 314.

The difference between the optical transmitter 310 and the optical transmitter 10 in terms of the configuration and operation is explained below. A carrier frequency shifter 332 is disposed on the arm 26. The carrier frequency shifter 332 shifts a carrier frequency of the TM wave from the polarization beam splitter 22 by frequency f according to a tone signal of frequency f from a local oscillator 334. The carrier frequency shifter 332 is composed of, for example, an acoustooptic (AO) optical modulator or LN optical modulator and an image rejection optical bandpass filter, and an optical carrier frequency is shifted due to side band generated by modulation.

The optical receiver 314 is modified as below according to dispose the optical carrier frequency shifter 332 in the optical transmitter 310. That is, a central transmission wavelength and transmission wavelength band of the optical bandpass filter 342 is set so as to transmit not only a light having the wavelength λs but also a light having a wavelength shifted by the optical carrier frequency shifter 332. In addition, a carrier frequency shifter 372 is disposed on the arm 50. The carrier frequency shifter 372 shifts an optical carrier frequency of the TM wave on the arm 50 by f that is an oscillation frequency of a voltage control oscillator (VCO) 373 in the opposite direction with the carrier frequency shifter 332 according to an output from the VCO 373. A controller 374 controls the oscillation frequency of the VCO 373 so that a mean output level of the amplifier 64 approaches to zero. Owing to the optical carrier frequency shifter 372, VCO 373, and controller 374, the optical carrier frequency of the TM wave on the arm 50 returns to a frequency corresponding to the signal wavelength λs.

Although an example of optical carrier frequency shift applied to the explanatory embodiment shown in FIG. 1 was explained above, the optical carrier frequency shift of the embodiment shown in FIG. 5 can be applied to the explanatory embodiments shown in FIGS. 2 and 3.

While the invention has been described with reference to certain specific embodiments, it will be apparent to those skilled in the art that various changes and modifications can be made to the specific embodiments without departing from the spirit and scope of the invention as defined in the claims and equivalents thereof.

The invention claimed is:

1. An optical transmission method comprising:
   outputting an output light having first and second polarization components, the first and second polarization components being orthogonal to each other;
   generating a phase-modulated signal light by phase-modulating the first polarization component of the output light according to a transmission data to output the generated phase-modulated signal light and the second polarization component into an optical transmission line in an orthogonal polarization state;
   coupling the phase-modulated signal light and the second polarization component input from the optical transmission line in the same polarization direction so as to convert the phase-modulated signal light into an intensity-modulated signal light;
   converting the intensity-modulated signal light into an electric signal; and
   restoring the transmission data from the electric signal;
   restoring comprises computing a bit error rate of a received data and
   wherein the coupling to convert the phase-modulated signal light into the intensity-modulated signal light comprises controlling a polarization direction of a light input from the optical transmission line so as to decrease the bit error rate according to the computed bit error rate.

2. An optical transmission method comprising:
   outputting an output light having first and second polarization components, the first and second polarization components being orthogonal to each other;
   generating a phase-modulated signal light by phase-modulating the first polarization component of the output light according to a transmission data to output the generated phase-modulated signal light and the second polarization component into an optical transmission line in an orthogonal polarization state;
   coupling the phase-modulated signal light and the second polarization component input from the optical transmission line in the same polarization direction so as to convert the phase-modulated signal light into an intensity-modulated signal light;
   converting the intensity-modulated signal light into an electric signal;
   restoring the transmission data from the electric signal; and
   shifting an optical carrier frequency of the second polarization component by a predetermined frequency before the second polarization component is output into the optical transmission line, wherein
   the coupling to convert the phase-modulated signal light into the intensity-modulated signal light comprises restoring the optical carrier frequency of the second polarization component by the predetermined frequency before the coupling with the phase-modulated signal light.

3. An optical transmission system to transmit a transmission signal via an optical transmission line by phase modulation, the system comprising:
   an optical transmitter for transmitting the transmission signal via the optical transmission line, the optical transmitter comprising:
      a laser light source to generate a laser light having first and second polarization components, the first and second polarization components being orthogonal to each other; and
      a data modulator to phase-modulate the first polarization component in the laser light of the laser light source according to a transmission data and to output the generated phase-modulated signal light and the second polarization component in an orthogonal polarization state; and
   an optical receiver for receiving the transmission signal via the optical transmission line, the optical receiver comprising:
      a first polarization splitter to split the transmission signal output from the optical transmission line into a third polarization component that includes the phase-modulated signal light and a fourth polarization component being orthogonal to the third polarization component;
      a first polarization coupler to couple the third and fourth polarization components in the same polarization direction;
      a photoelectric converter to convert an output signal light from the first polarization coupler into an electric signal; and a restorer to restore the transmission data out of the electric signal output from the photoelectric converter.

4. The system of claim 3 wherein the data modulator comprises:
a second polarization splitter to split the laser light of the laser light source into the first and the second polarization components;
a phase modulator to phase-modulate the first polarization component split by the polarization splitter according to the transmission data and to output the phase-modulated signal light; and
a second polarization coupler to couple the second polarization component split by the polarization splitter and the phase-modulated signal light with polarizations being orthogonal to each other and to output the coupled second polarization component and the phase-modulated signal light into the optical transmission line as a transmission signal light.

5. The system of claim 4 wherein the phase modulator comprises a first optical splitter to split the first polarization component into n portions and to apply the split portions into respective arms of the phase modulator; phase modulating elements disposed on the respective arms to phase-modulate an input light according to respective transmission data; and an optical coupler to couple output lights from the respective arms and
wherein the optical receiver comprises n systems of data receivers, each data receiver having the first polarization splitter, the first polarization coupler, and the photoelectric converter; and second optical splitter to split a light input from the optical transmission line to respectively supply the split lights into the n systems of data receivers.

6. The system of claim 4 wherein the phase modulator comprises a plurality of phase modulating elements being disposed in series and
wherein the optical receiver comprises n systems of data receivers, each data receiver having the first polarization splitter, the first polarization coupler, and the photoelectric converter, and an optical splitter to split a light input from the optical transmission line to respectively supply the split lights into the n systems of data receivers.

7. The system of claim 4 wherein the first polarization coupler comprises a coupler/splitter to generate a constructive mode and a destructive mode of an intensity-modulated signal light through interference of the third and fourth polarization components by coupling them in the same polarization direction and
wherein the photoelectric converter comprises two photo diodes to balance-receive the constructive mode and the destructive mode of the intensity-modulated signal light.

8. The system of claim 4 wherein the first polarization coupler comprises:
a first arm to transmit the third polarization component split by the first polarization splitter;
a second arm to transmit the fourth polarization component split by the first polarization splitter;
a polarization converter disposed on one of the first and second arms to convert a polarization of an input light into an orthogonal polarization; and
an optical coupler to couple output lights from the first and second arms.

9. The system of claim 8 wherein the optical coupler comprises a coupler/splitter to generate a constructive mode and a destructive mode of an intensity-modulated signal light by mutually interfering the output lights from the first and second arms, and
the photoelectric converter comprises two photodiodes to balance-receive the constructive mode and the destructive mode of the intensity-modulated signal light.

10. The system of claim 4 wherein the restorer comprises a error corrector to calculate an error rate of a received data, and
the first polarization splitter comprises a polarization controller to control a polarization direction of the transmission signal light output from the optical transmission line, a polarization beam splitter to split an output light from the polarization controller into the third and fourth polarization components that are orthogonal to each other, and an error controller to control the polarization controller so as to decrease the error rate of the error corrector.

11. The system of claim 4, wherein the optical transmitter further comprises a first optical frequency shifter disposed between the second polarization splitter and the second polarization coupler to shift an optical carrier frequency of the first polarization component by a predetermined frequency and wherein the first polarization coupler comprises a second optical carrier frequency shifter to shift an optical carrier frequency of the fourth polarization component by the predetermined frequency in the opposite direction before the third and fourth polarization components are coupled.

* * * * *

UNITED STATES PATENT AND TRADEMARK OFFICE
CERTIFICATE OF CORRECTION

PATENT NO. : 7,421,210 B2 Page 1 of 1
APPLICATION NO. : 11/000838
DATED : September 2, 2008
INVENTOR(S) : Tetsuya Miyazaki It is certified that error appears in the above-identified patent and that said Letters Patent is hereby corrected as shown below:

Column 8, lines 38-39, Claim 3  Delete "byphase modulation",
Insert --by phase-modulation--

Column 10, line 26, Claim 10  Delete "comprises a",
Insert --comprises an--

Signed and Sealed this

Thirtieth Day of June, 2009

JOHN DOLL
*Acting Director of the United States Patent and Trademark Office*